United States Patent [19]

Jadwin

[11] Patent Number: 4,574,894
[45] Date of Patent: Mar. 11, 1986

[54] BALL ACTUABLE CIRCULATING DUMP VALVE

[75] Inventor: Reese Jadwin, Westminster, Calif.

[73] Assignee: Smith International, Inc., Newport Beach, Calif.

[21] Appl. No.: 754,474

[22] Filed: Jul. 12, 1985

[51] Int. Cl.[4] ............................................. E21B 41/00
[52] U.S. Cl. .................................. 175/317; 166/317; 166/318; 166/319; 137/118; 137/71
[58] Field of Search .................. 137/71, 118; 166/317, 166/318, 319, 321, 154; 175/237, 317

[56] References Cited

U.S. PATENT DOCUMENTS

| 2,579,439 | 12/1951 | Noe | 137/118 X |
| 3,559,734 | 2/1971 | Pitts | 137/71 |
| 4,081,032 | 3/1978 | Hutchison | 166/317 |
| 4,441,558 | 4/1984 | Welch | 166/317 |
| 4,479,545 | 10/1984 | Eley | 166/154 X |
| 4,513,764 | 4/1985 | Yonker | 166/319 X |

Primary Examiner—Harold W. Weakley
Attorney, Agent, or Firm—Price, Gess & Ubell

[57] ABSTRACT

A dump valve for use in a downhole motor having a spring-based piston responsive to fluid flow to close a fluid flow port and to a ball actuated force to reopen the port.

10 Claims, 3 Drawing Figures

4,574,894

BALL ACTUABLE CIRCULATING DUMP VALVE

BACKGROUND OF THE INVENTION

The subject invention relates to downhole motors and more particularly, to apparatus for controlling the flow of drilling fluid when inserting and extracting a drill pipe from a hole.

In most drilling operations, drilling fluid or "mud" is used to maintain the drilled hole stability, lubricate and cool the downhole equipment and carry the drill cuttings to the surface. It is imperative that this fluid be allowed to enter and fill the drill pipe when tripping the pipe into the hole and it is most convenient to allow the fluid to drain from the pipe when tripping out of the hole.

Certain drilling assemblies possess a positive displacement feature, which will not permit fluid to pass through the motor unless the motor is turning. Therefore, a by-pass or dump valve is positioned just above the motor assembly for the purpose of filling and/or draining the drill pipe.

In the prior art, such valves have employed a fluid velocity actuated piston. The piston action either opens or closes ports separating the inside of the tool from the annulus surrounding the tool.

When there is no drilling fluid circulation (such as during trips, surveying, etc.), a spring holds the piston, or throat, in an "up" or open port position, thus, allowing fluid entry and exit through the ports of the valve body.

Such piston type valves have the disadvantage that the drilling fluid cannot be circulated because the port is automatically closed by the drilling fluid. The valve piston is actuated by the velocity of the drilling fluid when the rig pump is started. The piston is forced down, closing off the ports, and thereafter, directing all fluid into the motor. When pumping is stopped, the spring returns the piston to the "up" or open port position. The capability to circulate the fluid without driving the motor is particularly desirable when it is necessary to discharge gas buildups from the drilling fluid.

Another type of valve which has seen use is ball-actuated. In such a device, the port is blocked by an inner sleeve retained by a sheer pin. A ball may then be dropped down and forced against the sleeve by the drilling fluid causing the sleeve to break the sheer pin and move into a position where the port is open. This type of valve works admirably to open the port for circulation, for example, where it is desired to permit escape of gases from the fluid. However, it requires that the string be filled from the inside, rather than employing a port as with the spring-biased piston valve. Furthermore, once the pin is sheered, the string must be removed from the hole.

SUMMARY OF THE INVENTION

It is an object of the subject invention to provide a dump valve which eliminates many of the disadvantages of the prior art.

It is another object of the invention to provide a valve which will automatically fill while tripping in the hole, which is easier to machine and manufacture, and which does not require rig pumps to be turned off and on for activation.

In order to achieve these objects, a dump valve is provided which enables both piston and ball actuation. A spring biased piston is arranged such that it may close under pressure of drilling fluid to abut a sleeve. The sleeve is retained by a sheer pin and the piston is arranged such that a ball may be dropped and forced against the piston, causing the sheer pin to sheer and the piston assembly to be forced beyond the port, thereby permitting fluid under pressure to flow through the port.

The invention thus provides the following advantages (1) increased reliability (2) automatic fill while tripping in the hole, (3) a fully open valve while circulating (4) a fully open valve while tripping out, assuring a dry drill string.

DETAILED DESCRIPTION OF THE PREFERRED EMBODIMENT

Figure 1:
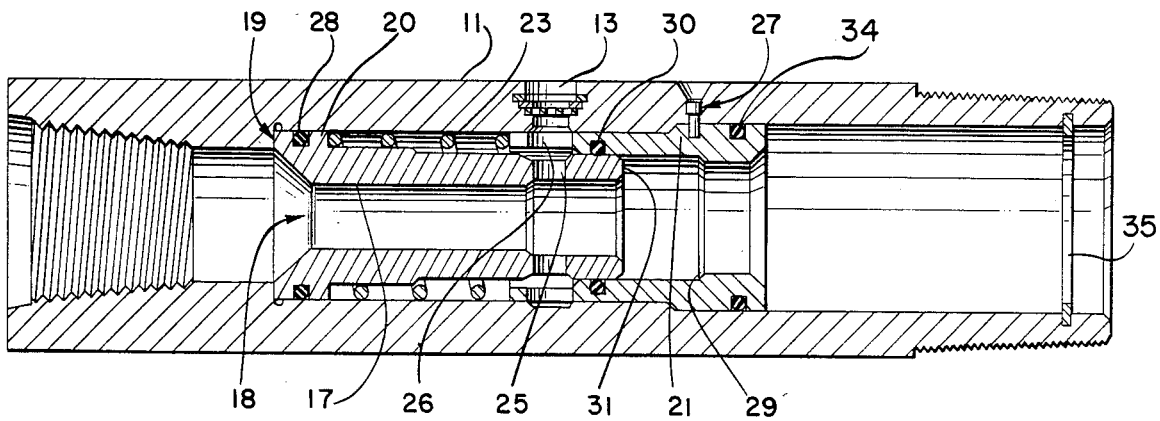
FIG. 1 is a sectional drawing illustrating the preferred embodiment of the invention.

FIG. 1 illustrates a cross section of the preferred embodiment. As shown, the apparatus includes a drill pipe housing 11, having a port assembly 13 providing an opening for fluid flow. A piston 17 is mounted between an internal abutment 19 of the housing 11 and a generally cylindrical retaining sleeve 21. The piston 17 has an orifice 18 which continuously decreases in diameter up to a point. A coil spring 23 is mounted between the sleeve 21 and an inner lip 20 of the piston 17. The spring 23 normally biases the piston 17 against the internal abutment 19. An opening 25 in the piston 21 is thereby positioned contiguous to the port assembly opening and an opening 26 in the retaining sleeve 21. This arrangement of openings permits fluid communication between the interior and exterior of the drill pipe. Suitable seals 28, 30 and 34, such as O-rings mounted in channels, are provided for establishing a seal between the piston 17 and the housing 11; between the piston 17 and the retaining sleeve 21; and between the retaining sleeve 21 and the housing 11.

As further shown in FIG. 1, the retaining sleeve 21 is held in place by a sheer pin 27. The sleeve 21 has a protruding lip 29 at one end thereof. When the spring 23 is sufficiently compressed, the end 31 of piston 17 will abut the lip 29.

Figure 2:
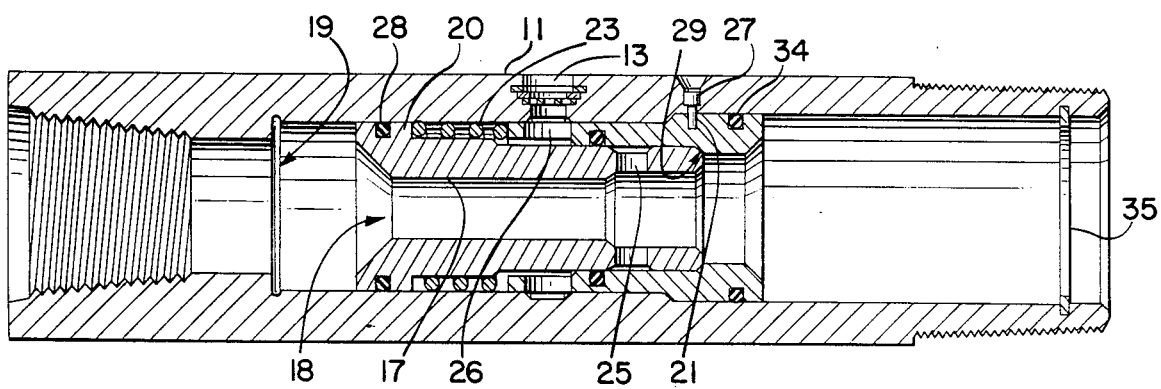
FIG. 2 is a sectional drawing illustrating the preferred embodiment during drilling operation.

In operation, when the drill string is inserted into the hole, the spring 23 is unbiased and drilling fluid is free to flow through the port assembly 23 to fill the drill pipe. When the drilling fluid is placed under pressure, the piston 17 is forced down into contact with the internal abutment 19. The port assembly 23 is thereby closed off, as illustrated in FIG. 2.

Figure 3:
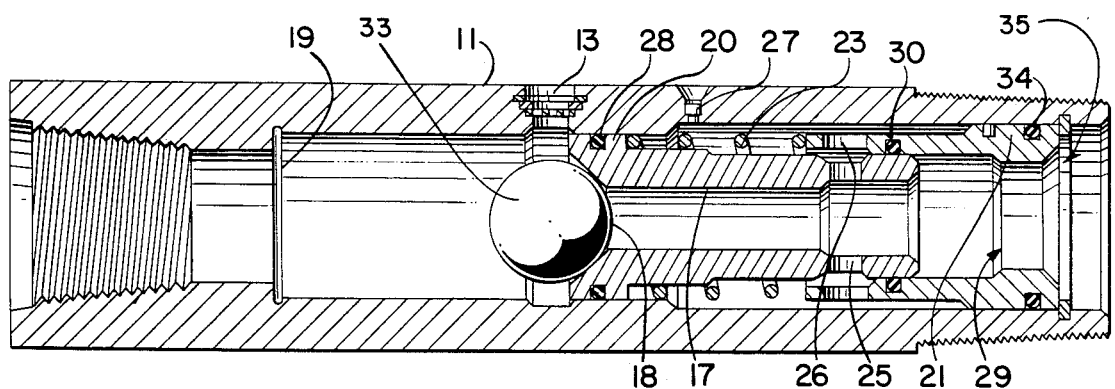
FIG. 3 is a sectional drawing illustrating ball actuation of the preferred embodiment.

In FIG. 3, a ball 33 has been inserted in the drill pipe. The ball 33 has come to rest in the orifice 18 of the piston 17, closing off fluid flow through the piston 17. The fluid pressure against the ball 33 and the piston 17 has further overcome the sheer strength of the sheer pin 27 and has forced the piston 17 and the sleeve 21 down the drill pipe to a stop 35. The port assembly 13 is thereby opened to pressurized fluid flow.

The structure of the preferred embodiment thus provides an improved valve structure permitting more functions than in the prior art. It will be apparent to those skilled in the art that the preferred embodiment just described is subject to numerous modifications and adaptations without departing from the scope and spirit of the invention. Therefore, it is to be understood that, with the scope of the appended claims, the invention may be practiced other than as specifically described herein.

What is claimed is:

1. Drilling apparatus comprising:

a drill pipe housing having a port therein;

means providing a first abutment at a first point within said housing;

retaining sleeve means slidably mounted within said housing and having a first opening therein;

means for holding said retaining sleeve means in a first position wherein said first opening communicates with said port and responsive to a force of selected magnitude to release said retaining sleeve means;

means providing an abutting surface on said retaining sleeve means;

piston means mounted within said housing adjacent said abutment and having a second opening therein for communicating with said port, said piston means being slidable to a first position in response to fluid flow wherein said second opening no longer communicates with said port and to a second position wherein said piston means applies force to said abutting surface; and means for biasing said piston means in a position wherein said opening communicates with said port and yieldable to a force less than or equal to said selected force to enable said piston means to exert said selected force upon said retaining sleeve means.

2. The apparatus of claim 1 wherein said spring means is mounted between a lip on said piston means and said retaining means.

3. The apparatus of claim 1 further including sealing means between said piston means and said housing, between said piston means and said retaining means and between said retaining means and said housing.

4. The apparatus of claim 1 wherein said means for holding comprises a sheer pin.

5. The apparatus of claim 4 wherein said biasing means comprises a coil spring.

6. The apparatus of claim 5 wherein said means providing a first abutment comprises an abutting surface integrally formed with said housing.

7. The apparatus of claim 6 wherein said means providing an abutting surface comprises a lip integrally formed with said retaining sleeve means.

8. The apparatus of claim 1 wherein said first end of said piston means is shaped to receive at least a portion of a ball.

9. Valve apparatus comprising:

a housing having a port therein;

means within said housing and responsive to pressurized fluid flow through said housing to close said port and further responsive to a ball dropped into said housing for reopening said port during pressurized fluid flow.

10. The apparatus of claim 9 wherein said means comprises:

piston means; and means for biasing said piston means in a position wherein said port is open, responsive to a first force for enabling said piston means to move to a first position wherein said piston means closes said port, and responsive to a second force to permit said piston means to move beyond said position to a second position wherein said port is open.

* * * * *